(12) United States Patent
Pischella

(10) Patent No.: US 7,224,972 B2
(45) Date of Patent: May 29, 2007

(54) BLIND HANDOVER TECHNIQUE

(75) Inventor: Mylène Pischella, Paris (FR)

(73) Assignee: France Telecom, Paris (FR)

( * ) Notice: Subject to any disclaimer, the term of this patent is extended or adjusted under 35 U.S.C. 154(b) by 95 days.

(21) Appl. No.: 11/075,962

(22) Filed: Mar. 9, 2005

(65) Prior Publication Data
US 2005/0202821 A1    Sep. 15, 2005

(30) Foreign Application Priority Data
Mar. 10, 2004    (EP) .................................. 04290654

(51) Int. Cl.
*H04Q 7/20* (2006.01)
(52) U.S. Cl. .................... 455/436; 455/452.2; 455/448; 455/444; 455/435.2; 455/451; 455/560; 370/331
(58) Field of Classification Search ........ 455/436–443, 455/432.1, 435.1, 435.2, 428, 445, 67.11; 370/328, 331, 332, 335, 338
See application file for complete search history.

(56) References Cited

U.S. PATENT DOCUMENTS

| | | | |
|---|---|---|---|
| 6,252,861 B1 * | 6/2001 | Bernstein et al. ............ 455/443 |
| 6,640,102 B2 * | 10/2003 | Frodigh et al. ............. 455/436 |
| 6,965,585 B2 * | 11/2005 | Grilli et al. .................. 370/331 |
| 7,058,404 B2 * | 6/2006 | Bruecken .................... 455/436 |
| 7,139,575 B1 * | 11/2006 | Chen et al. .................. 455/437 |
| 2002/0102976 A1 * | 8/2002 | Newbury et al. ........... 455/436 |
| 2002/0151325 A1 * | 10/2002 | Fitton et al. ................ 455/553 |
| 2003/0224730 A1 * | 12/2003 | Muszynski et al. ........... 455/62 |
| 2003/0227946 A1 * | 12/2003 | Schwarz et al. ............. 370/331 |
| 2004/0121770 A1 * | 6/2004 | Tigerstedt et al. .......... 455/436 |
| 2004/0162072 A1 * | 8/2004 | Sigle et al. .................. 455/436 |
| 2004/0248519 A1 * | 12/2004 | Niemela ................... 455/67.11 |
| 2005/0073977 A1 * | 4/2005 | Vanghi et al. ............... 370/335 |
| 2005/0170836 A1 * | 8/2005 | Bruecken ..................... 455/439 |
| 2005/0277415 A1 * | 12/2005 | Hamalainen et al. ........ 455/436 |
| 2005/0277416 A1 * | 12/2005 | Tolli et al. ................... 455/436 |

FOREIGN PATENT DOCUMENTS

| | | |
|---|---|---|
| DE | 102 28 885 A1 | 1/2004 |
| GB | 2 289 191 A | 11/1995 |
| WO | WO 00/38457 A | 6/2000 |

* cited by examiner

*Primary Examiner*—George Eng
*Assistant Examiner*—Kamran Afshar
(74) *Attorney, Agent, or Firm*—Cohen Pontani Liberman & Pavane LLP

(57) ABSTRACT

In a mobile telecommunications system, when it is determined that a mobile terminal should be handed over from a first cell (primary cell) to a second cell (target cell), the target cell is chosen based on measurements of link quality in the primary network at the time when it is determined that handover is necessary, as well as on stored data indicative of the respective probabilities that different potential target cells will be the best handover target from a particular primary cell. This enables an appropriate choice of target cell to be made even in a case where it is not possible to make measurements on the target cells at the time when it is determined that handover is necessary (for example because handover is to a target cell that operates at a different frequency from that of the primary cell).

11 Claims, 3 Drawing Sheets

BLIND HANDOVER TECHNIQUE

FIELD OF THE INVENTION

The present invention relates to the field of mobile telecommunications and, more particularly, to the handover (or handoff) of mobile terminals from one network to another (whether that network be a different-frequency network belonging to the same system as the initial network, or a network belonging to a different system).

BACKGROUND OF THE INVENTION

In mobile telecommunications systems, there are circumstances where it is desirable for a mobile terminal (such as a telephone, portable computer with communications capabilities, etc.) which is operating at a first frequency in a first network belonging to a first system to transfer to a second network operating at a second frequency (which may belong to a second system, that is, a system using a different type of technology and defined according to a different standard: from this point of view a GSM network belongs to a different system from an UMTS FDD network, for instance). The handover may occur, for example, because the quality of the connection available in the primary network is unacceptably low.

Below, the network in which a mobile terminal is operating before a given handover will be designated the "primary network" and its cells will be referred to as "primary cells", the network to which the terminal may be handed over will be designated the "target network" and its cells the "target cells". It should be understood that, in the present document, the word "primary" in the expressions "primary cell" and "primary network" does not denote any particular position of the cell or network in a hierarchy of cells or networks. Moreover, "a cell" may be an omnicell, a sector cell, etc.

Different types of handover may be envisaged, as indicated in Table 1 below:

TABLE 1

| Primary Network | Target Network | | Handover Type |
|---|---|---|---|
| System A Frequency I | System A | Frequency J | Intra-system, inter-frequency handover |
| | System B | Frequency J | Inter-system handover |

If the primary network is a time division duplex (TDD) network then, even while the mobile terminal is transmitting or receiving data/voice, there are time slots when it is inactive (that is, it is neither sending nor transmitting signals). These time slots can be used to perform measurements on channels operating at other frequencies, thus enabling the terminal to evaluate the performance of candidate target networks.

However, if the primary network is a frequency division duplex (FDD) network, such as a Universal Mobile Telecommunication System (UMTS) FDD network then, when the terminal is active and currently transmitting or receiving data, there are no inactive periods available for performing measurements at other frequencies. So, in this case, the terminal cannot readily evaluate the performance of candidate target networks.

Various techniques have been proposed to enable intra-system inter-frequency handovers, or inter-system handovers, to be performed by terminals operating in primary networks using FDD (such as UMTS FDD networks). These include techniques which use special means to enable measurements to be performed on the candidate target network(s), and so-called "blind handover" techniques.

Techniques Using Measurements on the Target Network:

A first approach which enables measurements to be made on the target network is the "dual receiver" approach in which the radio terminal (e.g. mobile telephone/computer, etc.) is adapted to enable it simultaneously to demodulate two different frequencies.

This approach has a number of disadvantages. Firstly, power consumption of the terminal is increased. Secondly, if the terminal is adapted to operate both in UMTS FDD networks and in GSM 1800 networks then a problem can arise (due to the closeness of the frequencies of the UMTS FDD uplink band and the GSM 1800 downlink band) when the contemplated handover is from an UMTS FDD network to a GSM 1800 network. More specifically, if the frequencies corresponding to the UMTS FDD uplink band and the GSM 1800 downlink band are not perfectly isolated then the dual receiver terminal may not be able to demodulate them both. In such a case another technique would be required in order to enable the terminal to perform measurements on the target network. Finally, the mobile terminal comprises two receivers and, accordingly, requires extra circuitry compared to a standard terminal: which increases its size, cost and complexity.

A second approach which enables the terminal to make measurements on the target network consists in operating the terminal in "compressed mode". This involves the terminal ceasing reception on its UMTS FDD primary frequency during pattern gaps that are specified in the 3GPP standard (see part TS 25.215, entitled "Physical-layer measurements (FDD)", of the definition of the 3G standard by the 3GPP). However, compressed mode operation deteriorates link level performance, uplink coverage and the overall capacity of the system.

Furthermore, known handover techniques which involve the making of measurements on the target network delay the triggering of the handover itself. This can lead to the terminal becoming disconnected if the handover was required as a matter of urgency, for example because the terminal had entered a so-called "dead zone" in the primary network.

Blind Handover Techniques

A "beacon pilot" blind handover technique has been proposed in which the target network, which normally operates at a frequency $f_t$, broadcasts a "beacon pilot" at the same frequency $f_p$ as the frequency of the primary network. This beacon pilot consists of a pilot channel and a synchronisation channel and enables the mobile terminal to evaluate the propagation loss between itself and the target network.

One disadvantage of the "beacon pilot" approach is that it requires deployment of pilot antennas, increasing the cost of the system infrastructure. Another disadvantage arises in the case of an intra-system, inter-frequency handover between primary and target networks which are UMTS FDD networks operating at adjacent frequencies. In this case the pilot transmission can generate interference on the target network, making its capacity decrease.

Another known blind handover consists in a "direct" blind handover in which a look-up table is held, for example, in the Radio Network Controller (RNC) of the primary network (assuming an UMTS FDD primary network). This look-up table (or "planning table") indicates, for each primary cell, which target cell should be used in a handover. If the handover is between systems having co-located cells then this blind handover method works reasonably well. However, in the case where the transfer is an inter-system transfer there is no guarantee that the boundaries of the cells of the two systems will be defined in the same locations. If the primary and target cells are not co-located then the quality of the connection available in the target cell will vary depending upon the geographic location of the mobile terminal within the primary cell. Thus, for mobile terminals at certain locations within the primary cell, the target cell specified in the planning table will not be the best one to use.

SUMMARY OF THE INVENTION

The preferred embodiments of the present invention provide a blind handover technique which avoids the above-described disadvantages of the known techniques. More particularly, the preferred embodiments of the present invention provide a handover technique which avoids the need for specific costly practices (such as the use of dual frequency terminals, or for extra system transmissions of the beacon pilot type) and avoids deteriorating the system capacity.

Furthermore, using the blind handover technique of the present invention the target of a handover can be decided at a particular time without, at that time, taking measurements at frequencies different from that at which the mobile terminal is communicating.

Moreover, the preferred embodiments of the present invention select a target cell for the blind handover in a manner which seeks to provide a suitable choice whether or not the primary cell and target cell are co-located.

The present invention provides a method of performing a blind handover of a mobile terminal from a primary cell in a primary network of a mobile telecommunications system to a target cell in a target network, the method comprising the steps of:
  evaluating the quality of communications links available to the mobile terminal in the primary network; and
  selecting the target cell for the handover based on the evaluated quality measurement(s) and on predetermined data relating to cells in the target network.

The method of the present invention enables mobile terminals to avoid the need to perform measurements on another frequency before handover from the primary network to the target network. This has obvious benefits for mobile terminals operating in an FDD environment. However, this technique could also be used for terminals operating in a TDD environment. The present invention finds particular application in the implementation of intra-system inter-frequency handovers and in the performance of inter-system handovers.

Preferably, the predetermined data used when determining which cell to use as the target cell in the handover is data indicative of the suitability of different cells in the target network for being the target of a handover from one or more cells in the primary network.

Still more preferably, this predetermined data comprises data indicating the respective probabilities that different cells in the target network will be the best cell to use as the target cell in a handover from a different cells in the primary network, and the target cell selecting step selects the target cell for the handover by weighting said probability data based on the evaluated measurements of link quality in the primary network at the time when a decision on blind handover is made.

The blind handover method of the present invention seeks to optimize the choice of target cell in a manner which does not require the cells of the first and second networks to be co-located. However, this method can also be applied in the case where the cells of the first and second networks are co-located.

The blind handover method of the present invention advantageously includes the step of deciding whether or not handover is desirable for a given mobile terminal by comparing the evaluated link quality in the primary network with a threshold level, $T_{limit}$. Depending upon the value of $T_{limit}$ it may be appropriate to handover the mobile terminal to a different cell in the target network. Accordingly, it is advantageous if different sets of probability data are stored, applicable for respective different values of $T_{limit}$.

The quality of a communications link can be evaluated using different parameters. Depending upon the nature of the target network, a particular one of the available parameters may be more or less suitable for assessing which target cell would make the best target in a particular handover. Accordingly, it is advantageous if different sets of probability data are stored, applicable for respective different link-quality evaluation parameters The present invention further provides a control entity for use in a mobile telecommunications network, the control entity being adapted, in use, to instruct blind handovers of a mobile terminal from a primary cell of said network to a target cell in a different network, the control entity comprising:
  input means for receiving data indicating the quality of communications links available to the mobile terminal in the primary network;
  retrieval means for accessing predetermined data relating to cells in the target network; and
  computing means for selecting the target cell for the handover based on the evaluated quality measurement(s) and on the accessed predetermined data relating to cells in the target network.

The present invention still further provides a mobile telecommunications system adapted to implement blind handover of a mobile terminal from a primary cell in which the mobile terminal is operating to a target cell in a different network, the mobile telecommunications network comprising a control entity of the above-described type.

Further features and advantages of the present invention will become clear from the following description of preferred embodiments thereof, given by way of example not limitation, and the accompanying drawings, in which:

DETAILED DESCRIPTION OF THE DRAWINGS

In the following description a preferred embodiment of the invention will be described in which, while a mobile terminal is communicating, a decision is taken to hand over the terminal from one cell of a first network in a first system (the primary cell) to another cell (the target cell). The target cell may belong to a different system from the primary cell (inter-system handover), or it may belong to the same system but be a cell operating at a different frequency from the primary cell (intra-system, inter-frequency handover).

In the following description it will be assumed that the primary network is a UMTS network in which a radio network controller (RNC) controls use of radio resources in the cells for which it is responsible. However, the present invention is equally applicable to networks of other types in which other modules/entities control the use of radio resources in the various cells.

Figure 1:
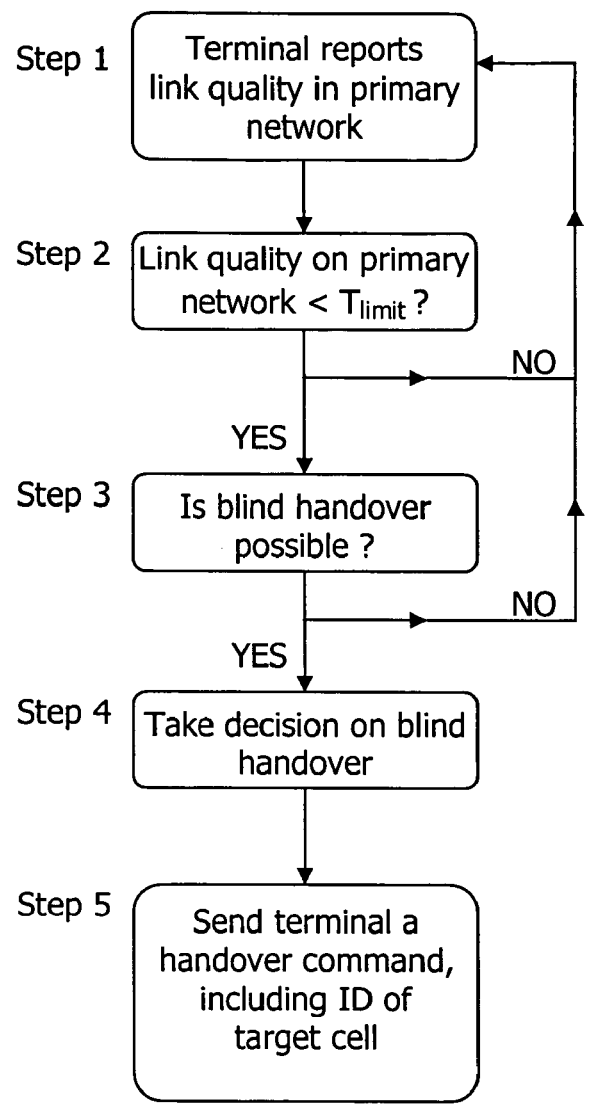
FIG. 1 is a flow diagram indicating the main steps performed by a radio network control entity in a primary network when instructing blind handovers according to a preferred embodiment of the present invention.

FIG. 1 outlines the main steps performed by the RNC when a blind handover of a mobile terminal occurs according to the preferred embodiment of the present invention.

It will be seen from FIG. 1 (step 1) that the RNC receives, from the mobile terminal, reports regarding the quality of the communications links in the primary network. More particularly, the mobile terminal reports on the link quality between itself and a number of different cells in the primary network. The 3GPP standard requires mobile terminals to make link-quality reports of this type. Thus, the present invention does not impose a new requirement on mobile terminals. The link quality can be quantified using a number of different parameters. Typical quality measurements are evaluated based on transmissions by the terminal on the common pilot channel (CPICH) and could consist of CPICH Ec/I0 (energy per chip/total interference) or CPICH RSCP (received signal level).

The RNC determines whether or not the quality of the communications links in the primary network are sufficiently good, by comparing the reported quality with a threshold level, $T_{limit}$ (step 2). The threshold level can be compared with the quality measurement(s) in a number of different ways. For example, the threshold level, $T_{limit}$, can be compared with the quality-measurement value which applies for the "best cell" in the primary network (that is, that cell within the primary network that is found, by this mobile terminal, to have the highest quality measurement at the current time), or $T_{limit}$ can be compared with a composite value representing some combination of the quality-measurements obtained for a few of the "best cells" in the primary network. Clearly, the appropriate value to use for the threshold level, $T_{limit}$, depends upon which parameter is being used to quantify the link quality.

If the signal quality reported for the primary network is better than the level represented by $T_{limit}$ then, in the preferred embodiment of the invention, no handover is considered to be necessary. In this case, the RNC awaits the next report on the quality of the communications links in the primary network (that is, the process returns to step 1 of FIG. 1).

If, on the other hand, the reported signal quality is worse than the level represented by $T_{limit}$, then a handover to a different network would be appropriate and the RNC next decides whether such a handover is possible (step 3). If the handover is not possible, for example because no alternative network is available, then the RNC awaits the next quality report relating to this mobile terminal (that is, the process returns to step 1 of FIG. 1). In some cases the RNC may decide to delay the handover of a mobile terminal from its primary cell to its target cell, for a period of time which, in the UMTS standard, is termed "time-to-trigger". In order for a handover to be instructed in this case, the link quality level must remain below $T_{limit}$ during the time-to-trigger period. If the handover is possible (and/or the link-quality has remained below $T_{limit}$ during the time-to-trigger period), then the RNC determines what the target of the handover should be (step 4). Below, more details of how the handover target is chosen will be given in relation to FIGS. 2 and 3.

Once the RNC has decided which cell will be the target of the handover, it sends a signal to the mobile terminal indicating the identity and characteristics of the target cell (step 5 of FIG. 1). It is preferred for the RNC to indicate what is the system, frequency and identification number of the target cell. The mobile terminal implements a handover to the target cell identified by the RNC.

In order to simplify the explanation, FIG. 1 indicates the steps that are taken by the RNC when performing a blind handover for one single mobile terminal. However, it should be understood that, in practice, the RNC will monitor the quality of the links being used by all the mobile terminals for which it is responsible and which are in the process of communicating. The RNC decides independently for each terminal whether or not it should undergo a handover, and what the target of the handover should be.

Figure 2:
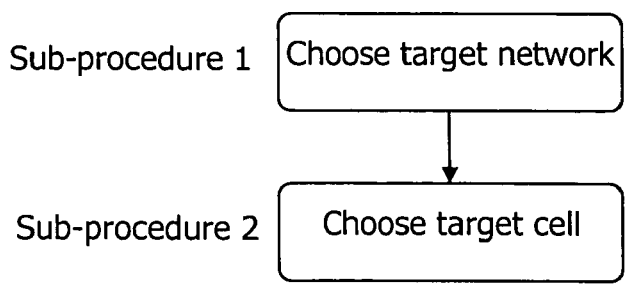
FIG. 2 is a flow diagram indicating the main sub-procedures in a process for deciding the target of a blind handover, in the preferred embodiment of the present invention.

FIG. 2 indicates the main sub-procedures involved when the RNC decides what should be the target of the handover.

It may be that there is more than one possible target network to which the mobile terminal could be handed over. Accordingly, as shown in FIG. 2, the RNC first determines what should be the target network (sub-procedure 1). The choice of target network typically will depend upon the design of the primary network and the available target networks, and on the suppliers' radio resource management algorithm choices. The present invention is not particularly limited with regard to the manner in which the target network is selected. For example, the choice may be predetermined (for example, a look-up table may store a relationship between particular primary networks and the target networks to be used in handovers), or adaptive.

Once the target network has been chosen, it is then necessary to select which cell within that network should be the target cell for the blind handover. This constitutes sub-procedure 2 represented in FIG. 2.

In order to decide which target cell out of a number of candidates would be the best one to use in a given blind handover, the preferred embodiment of the present invention makes use of measurements of the quality of links between the mobile terminal in question and different cells of the primary network at the time when handover is required.

The preferred embodiment of the invention also makes use of predetermined probability data. The probability data indicates, for a given primary cell, what is the probability that a given target cell would be the "best" one to use in a handover. A target cell is considered to be "the best" if it would provide the mobile terminal with a link having the highest quality measurement compared with the other cells in the target network. Depending upon the nature of the target network, different parameters are appropriate for use to evaluate the quality of the communications links. More specifically, if the target network is an UMTS FDD network then it is preferred to assess link quality based on CPICH Ec/I0 or CPICH RSCP, whereas if the target network is a GSM network then it is preferred to assess link quality based on the RxLEV (Received Signal Level).

An example of a probability data table is given below, as Table 2.

TABLE 2

| Primary Cell ($A_j$) | Potential Target Cell ($T_k$) | Probability ($B_{k,j}$) that this target cell is the best target for a handover from this primary cell (%) |
| --- | --- | --- |
| $A_a$ | $T_1$ | $B_{1,a}$ |
|  | $T_2$ | $B_{2,a}$ |
|  | $T_3$ | $B_{3,a}$ |
| $A_b$ | $T_1$ | $B_{1,b}$ |
|  | $T_3$ | $B_{3,b}$ |
|  | $T_4$ | $B_{4,b}$ |
| $A_c$ | $T_1$ | $B_{1,c}$ |
|  | $T_2$ | $B_{2,c}$ |
|  | $T_4$ | $B_{4,c}$ |

In the example represented in Table 1, there are only three cells in the primary network ($A_a$, $A_b$ and $A_c$) and there are a number of cells (including cells $T_1$, $T_2$, $T_3$, and $T_4$) in the target network. In the example represented in Table 1, entries have been included in the probability table only for those potential target cells having non-null probabilities of being "the best" target cell in a handover from a given primary cell. In other words, if a given cell (e.g. $T_2$) in the target network has substantially zero probability of being the best target of a handover from, for example, primary cell $A_b$, then no line has been included in Table 1 for this combination of primary and target cells. However, in practice, the probability table could include lines for all possible combinations of primary cells and cells in the target network.

The RNC stores (or has access to) probability table data covering all the cells in the primary network and covering all potential target networks. It will be understood that even if the RNC stores probability data relating to a particular target network, it will not necessarily be responsible for management of the radio resources of that network (e.g. if that target network belongs to a different system).

The probability table data can be different depending upon which parameter (CPICH Ec/I0; CPICH RSCP; RxLEV; etc.) is used to evaluate the quality of communications links. The probability table data can also be different depending upon what value is used for $T_{limit}$. Preferably the RNC will store (or have access to) probability tables applicable for each possible quality measurement parameter and for each possible different value of $T_{limit}$.

There are different ways in which the probability data can be generated. For example, system simulations can be performed modelling the performance of the primary network and the target network. In these simulations, for a given value of the threshold level, $T_{limit}$, an analysis is made of all meshes in which a selected quality measurement for the primary network is equal to this value of $T_{limit}$. For each mesh, the best target cell is noted. Statistical analysis of the results yields the probability that a particular target cell is the best-suited cell for a handover from a given primary cell for the selected value of $T_{limit}$ and the selected parameter used to evaluate link quality.

Another method that can be used to generate the probability data is to make observations in the field (e.g. of the number of mobiles per cell that have been active, the number of handovers that have taken place, etc.) using equipment such as an Observation and Maintenance Centre (OMC) possessed by a system operator. These observations are based on the behaviour of terminals that are capable of making measurements at frequencies other than the frequency of the primary network (that is, dual receivers or terminals operating in compressed mode) and which select for themselves the target for a given handover. When such terminals determine that a handover is required they measure the link quality available in the various cells of the target network and select the target cell having the best link quality. If these terminals are configured so as to make a handover when link quality equals a particular threshold level that is equal to $T_{limit}$ for the blind handover for which probability data is being gathered, then the target cells chosen by the terminals when they are located in various primary cells are the "best" target cells for the handover. By observing the frequency with which a given target cell is selected by a terminal in a given primary cell, the desired probability data can be generated.

The sub-procedure involved when the RNC chooses the target cell for a particular blind handover will now be described in greater detail with reference to FIG. 3.

First of all (step 1 of FIG. 3), the RNC notes what are the N primary cells which, for the mobile terminal in question and at the current time, give the highest values for a selected quality measurement (whether that be CPICH Ec/I0, CPICH RSCP, or some other parameter). In general, the mobile terminal will select the N primary cells giving the best current link quality and only transmit quality measurement data for these primary cells. The quality measurements obtained for these N cells are denoted $M_1, M_2, \ldots, M_N$, with $M_1$ representing the highest quality measurement and $M_N$ representing the $N^{th}$-highest quality measurement among the N primary cells. The primary cells themselves can be denoted $A_1, A_2, \ldots, A_N$, with $A_1$ representing the primary cell having the highest quality measurement and $A_N$ representing the primary cell having the $N^{th}$-highest quality measurement.

In a primary network which is an UMTS FDD network the number, N, can be set equal to the number of cells if the active set, or to a fixed value (which could be higher than the active set size). Because of limitations on the mobile terminal's measurement-making capacity, N shall be smaller than the total number of intra-frequency cells whose quality measurements can be reported to the RNC.

Figure 3:
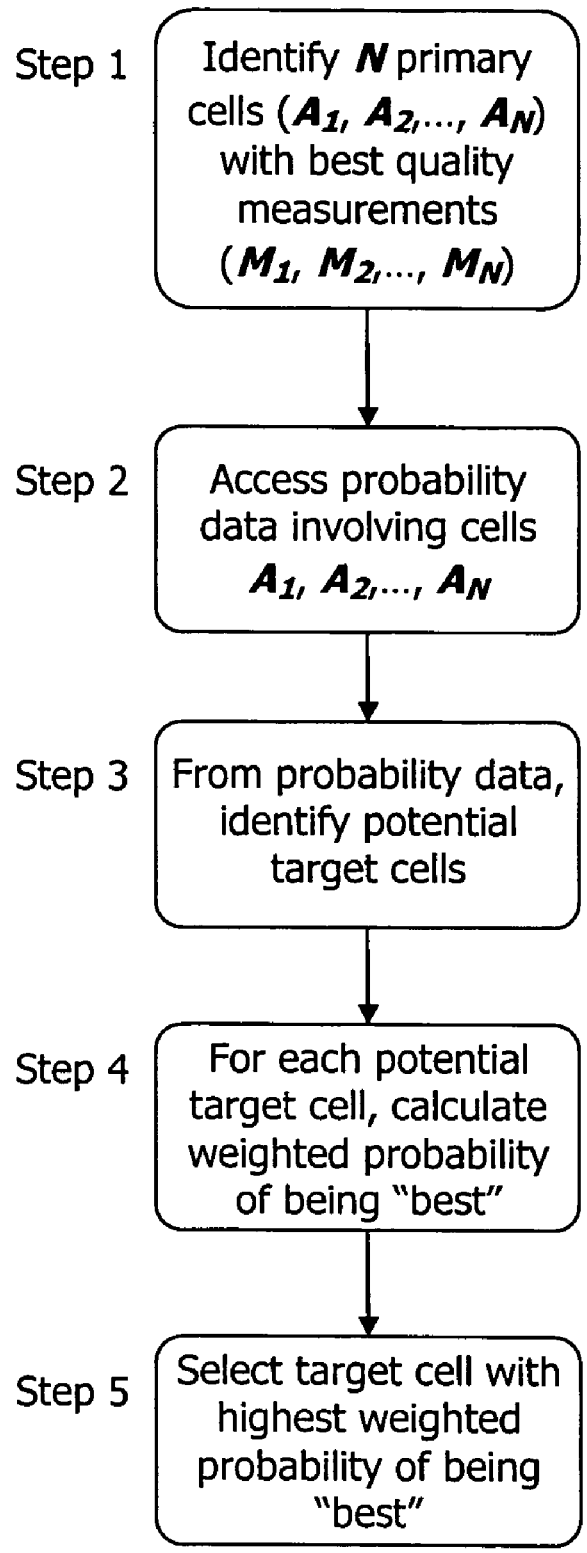
FIG. 3 is a flow diagram indicating the main steps in the target cell selection sub-procedures procedure of FIG. 2.

For each of the primary cells $A_1, A_2, \ldots, A_N$, probability table data is accessed applicable to the threshold level, $T_{limit}$, that was used in the decision on whether or not handover was required, and applicable to the quality measurement parameter (CPICH Ec/I0, or CPICH RSCP, etc.) that is appropriate for the selected target network—see step 2 of FIG. 3.

The probability data accessed for primary cells $A_1$, $A_2, \ldots, A_N$ is then analysed to determine which cells of the target network have a non-negligible probability of being the best target cell for use in a handover from these primary cells (step 3 of FIG. 3). These are the potential target cells that might constitute the best target cell to use in the present case.

For each potential target cell, $T_k$, a weighted probability, $P_k$, of being the best target cell to use in the present blind handover is calculated, as follows:

$$P_{ki} = \sum_{i=1}^{N} B_{k,i} \times \frac{M_i}{M_1} \div \sum_{i=1}^{N} \frac{M_i}{M_1}$$

where $B_{k,i}$ is the stored probability data indicating the probability that target cell $T_k$ will be the best target cell in a transfer from primary cell $A_i$, $M_i$ is the quality measurement for primary cell $A_i$ (and is the $i^{th}$—highest quality measurement determined by the mobile terminal for cells of the primary network) and $M_1$ is the highest quality measurement determined by the mobile terminal for cells of the primary network—step 4 of FIG. 3.

During the process of calculating the weighted probabilities for all of the potential target cells, the RNC may prepare a combination table collating the probability data applicable for each potential target cell, $T_k$. Table 3 below shows an example of such a combination table in a case where there are q potential target cells.

TABLE 3

| Pot. target cell, $T_k$ | Prob. $T_k$ is best target for handover from $A_1$ | Weight $M_1/M_1$ | Prob. $T_k$ is best target for handover from $A_2$ | Weight $M_2/M_1$ | ... | Prob. $T_k$ is best target for handover from $A_N$ | Weight $M_N/M_1$ | Weighted prob. $T_k$ is best target for handover |
|---|---|---|---|---|---|---|---|---|
| $T_1$ | $B_{1,1}$ | 1 | $B_{1,2}$ | $M_2/M_1$ | ... | $B_{1,N}$ | $M_N/M_1$ | $P_1$ |
| $T_2$ | $B_{2,1}$ | 1 | $B_{2,2}$ | $M_2/M_1$ | ... | $B_{2,N}$ | $M_N/M_1$ | $P_2$ |
| $T_3$ | $B_{3,1}$ | 1 | $B_{3,2}$ | $M_2/M_1$ | ... | $B_{3,N}$ | $M_N/M_1$ | $P_3$ |
| ... | ... | ... | ... | ... | ... | ... | ... | ... |
| $T_q$ | $B_{q,1}$ | 1 | $B_{q,2}$ | $M_2/M_1$ | ... | $B_{q,N}$ | $M_N/M_1$ | $P_q$ |

It is the potential target cell, $T_x$, which has the highest weighted probability, $P_x$, that the RNC will select as the target cell for the blind handover (step 5 of FIG. 3).

The above-described blind handover technique can be implemented in mobile telecommunications systems of various known types (UMTS FDD, UMTS TDD, GSM, GPRS, etc.). The 3GPP standard already requires mobile terminals to make link-quality reports back to the entity managing allocation of radio resources, either periodically or when triggered by specific events (such as a significant change detected in link quality). In general, all that is required in order to enable this blind handover technique to be put into practice in these systems of known type is a relatively simple adaptation of the entities which control the allocation of radio resources within the networks of the system (e.g. the RNCs of an UMTS system). Known mobile terminals could be used to implement the blind handover technique of the present invention, substantially without modification.

With respect to the RNCs (or the equivalent entity in networks that are not UMTS networks), these are generally already adapted so as to be able to perform the following functions:

monitoring quality measurements reported by each mobile terminal;

comparison of reported quality measurements with a selected threshold level, $T_{limit}$ (and, optionally, determination of which threshold level to use); and formulating a blind handover command signal identifying a target cell, and transmitting this signal to the appropriate mobile terminal.

They are also often implemented by suppliers so as to be able to perform the following additional functions:

determination of whether blind handover is possible; and determination (for example by look-up in a locally or remotely stored table) of which target network to use for a blind handover from a given primary cell, and of the quality measurement parameter that is appropriate for use in assessing the "best" target cell in this target network.

Accordingly, in order to implement the blind handover technique of the present invention it will often only be necessary to adapt the RNC (or equivalent entity) so as to be able to perform the following further functions:

accessing probability data ($B_{k,j}$) indicating the probability that a given target cell ($T_k$) is the "best" target cell to use in a handover from a particular primary cell ($A_j$), for a selected threshold level, $T_{limit}$, and for the quality measurement parameter that is appropriate for use in assessing the "best" target cell in this target network; and calculating the weighted probabilities ($P_k$) and selecting as the target cell for the handover that one of the cells in the target network which has the highest weighted probability.

In general, the necessary adaptation of the RNC (or equivalent) will be achieved by suitable programming of processing means and/or memories already present in the RNC (or equivalent). The required programming will be readily apparent to the skilled person based on his/her common general knowledge in this field so no further details will be given here.

Alternatively, the RNC (or equivalent) could be provided with dedicated circuitry for implementing the above functions.

With regard to the RNCs (or equivalent) it is also necessary to ensure that these have access to the probability data $B_{k,j}$. This can entail providing the RNC (or equivalent) with a dedicated internal memory storing the probability data, or storage of the probability data in a memory that is already provided in known RNCs (and equivalents), or pointing the RNC (or equivalent) to a source of this probability data (for example by programming into the RNC the address of an external memory where this data is stored).

It will be seen that, in order to implement the blind handover technique according to the preferred embodiment of the present invention in known mobile telecommunications systems, it is only necessary to add the capability of performing the sub-procedure 2 indicated in FIG. 2 hereof, according to steps 1 to 5 of FIG. 3.

Figure 4:
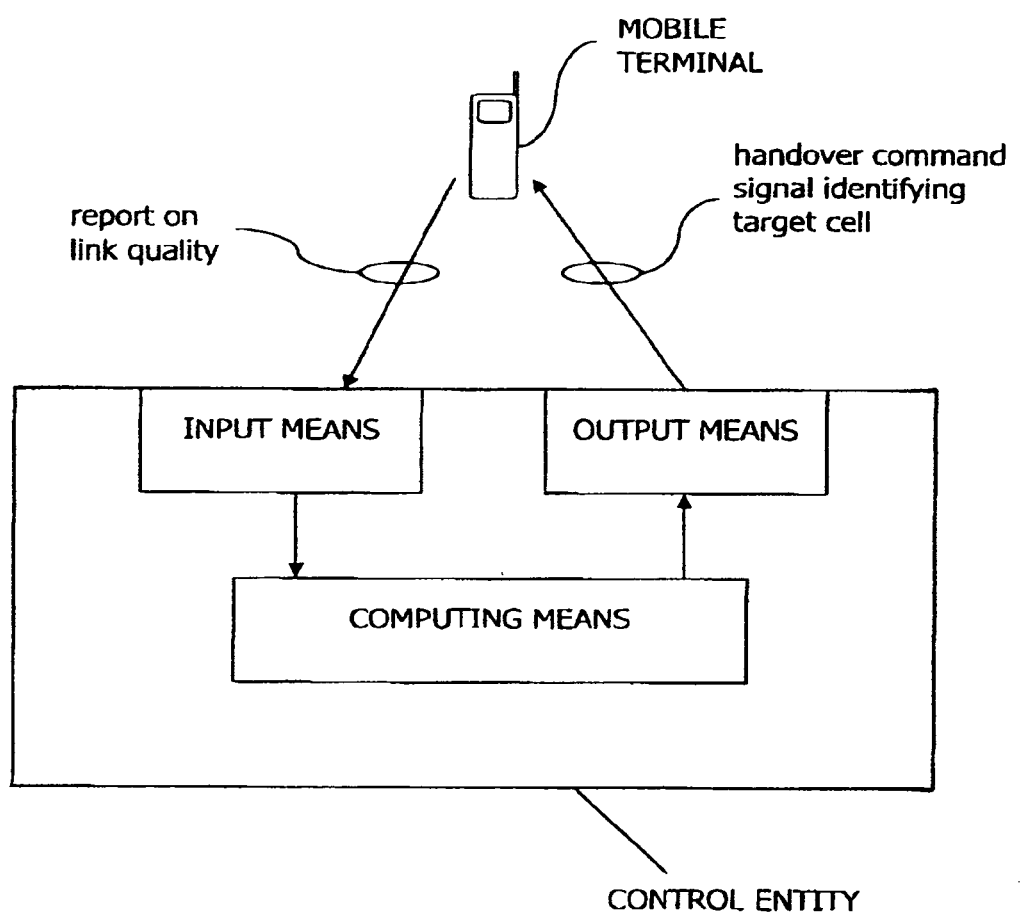
FIG. 4 is a schematic block diagram illustrating the control entity in accordance with the invention.

As indicated in FIG. 4, the present invention further provides a control entity for use in a mobile telecommunications network, the control entity being adapted, in use, to instruct blind handovers of a mobile terminal from a primary cell of said network to a target cell in a different network, the control entity comprising:

input means for receiving data indicating the quality of communications links available to the mobile terminal in the primary network; and computing means for selecting the target cell for the handover based on the evaluated quality measurements and on the accessed predetermined data relating to cells in the target network.

Although the present invention has been described above in terms of particular preferred embodiments thereof, the skilled person will readily appreciate that the present invention is not limited with respect to the particular details of those embodiments. More particularly, the skilled person will understand that various modifications and adaptations can be made in the above-described embodiments without departing from the scope of the invention as defined in the accompanying claims.

For example although, in the above-described preferred embodiments, probability data is stored in an internal memory of the entity controlling the allocation of radio resources in the primary network, this probability data could be held on a recording medium (CDROM, DVDROM, etc.) that is accessed by this entity and/or can be stored in a memory remote from this entity and accessed via a network.

Moreover although, in the above-described preferred embodiment of the invention, the decision on whether or not a blind handover is necessary is taken with reference to the link quality available to a mobile terminal, the decision to perform a handover can be based on other criteria. For example, it could be preferred to ensure that all mobile terminals which are speech users be handled by a GSM network whereas all data users (who require higher capacity) should be handled by a UMTS network. In such a case, a handover could be instructed, for example, when a particular mobile terminal changes from making a voice call to making a data transmission.

What is claimed is:

1. A method of performing a blind handover of a mobile terminal from a primary cell ($A_j$) in a primary network of a mobile telecommunications system to a target cell ($T_k$) in a target network, wherein said primary network comprises a control entity, the method comprising the steps of:
   evaluating a quality of communications links between the mobile terminal and a plurality of different cells in the primary network to provide evaluated quality measurements (M); and
   selecting the target cell for the handover based on the evaluated quality measurements (M) and on data ($B_{kj}$) indicating respective probabilities that different cells ($T_k$) in the target network will be a best cell to use as the target cell in the handover from different cells ($A_j$) in the primary network, wherein the target cell for the handover is selected by weighting said probability data ($B_{j,k}$) based on the evaluated quality measurements (M).

2. The blind handover method according to claim 1, wherein:
   the evaluating step comprises the step of identifying a number (N) of cells ($A_1, A_2, \ldots, A_N$) in the primary network that provide the best link quality for the mobile terminal; and
   the target cell selecting step comprises the steps of calculating, for different cells ($T_k$) in the target network, weighted probabilities ($P_k$) such that:

$$P_k = \sum_{i=1}^{N} B_{k,i} \times \frac{M_i}{M_1} \div \sum_{i=1}^{N} \frac{M_i}{M_1},$$

where $B_{k,i}$ is predetermined probability data indicating the probability that target cell $T_k$ will be the best target cell in a transfer from primary cell $A_i$, the primary cells are ordered according to the evaluated link quality associated therewith such that primary cell $A_1$ is the primary cell with highest evaluated link quality and primary cell $A_N$ is the primary cell with N-$^{th}$ highest evaluated link quality, and $M_i$ is the quality measurement for primary cell $A_i$.

3. The blind handover method according to claim 1, wherein the predetermined probability data comprises a plurality of sets of data, each set of data indicating probabilities that, when link quality in the target network is evaluated using a respective different quality-measurement parameter, different cells ($T_k$) in the target network will be the best cell to use as the target cell in the handover.

4. The blind handover method according to claim 1, further comprising the step of:
   deciding whether handover of the mobile terminal is desirable by comparing link quality data obtained in the evaluating step with a threshold level ($T_{limit}$);
   wherein the predetermined probability data comprises a plurality of sets of data, each set of data indicating probabilities that, when the threshold level ($T_{limit}$) is a respective different value, different cells ($T_k$) in the target network will be the best cell to use as the target cell in the handover.

5. The blind handover method according to claim 1, wherein the primary network and the target network form part of the same mobile telecommunications system but have different operating frequencies.

6. The blind handover method according to claim 1, wherein the primary network and the target network form part of two different mobile telecommunications systems.

7. A control entity for use in a mobile telecommunications network, the control entity being adapted, in use, to instruct blind handovers of a mobile terminal from a primary cell of said network to a target cell in a different network, the control entity comprising:
   input means for receiving data indicating a quality of communications links between the mobile terminal and a plurality of different cells in a primary network to provide evaluated quality measurements (M); and
   computing means for selecting the target cell for the handover based on evaluated quality measurements (M) and on accessed probability data ($B_{k,j}$) indicating respective probabilities that different cells ($T_k$) in a target network will be the best cell to use as the target cell in the handover from different cells ($A_j$) in the primary network, the computing means being adapted to weight the accessed probability data ($B_{kj}$) based on the evaluated quality measurements (M).

8. The control entity according to claim 7, further comprising:
   identification means, cooperating with the input means, for identifying a number (N) of cells ($A_1, A_2, \ldots, A_N$) in the primary network that provide the best link quality for the mobile terminal;

wherein the computing means is adapted to compute, for different cells ($T_k$) in the target network, weighted probabilities ($P_k$) such that:

$$P_{k,} = \sum_{i=1}^{N} B_{k,i} \times \frac{M_i}{M_1} \div \sum_{i=1}^{N} \frac{M_i}{M_1},$$

where $B_{k,i}$ is predetermined probability data indicating the probability that target cell $T_k$ will be the best target cell in a transfer from primary cell $A_1$, the primary cells are ordered according to the evaluated link quality associated therewith such that primary cell $A_1$ is the primary cell with highest evaluated link quality and primary cell $A_N$ is the primary cell with N-$^{th}$ highest evaluated link quality, and $M_i$ is the quality measurement for primary cell $A_i$.

9. The control entity according to claim 7, further comprising:
means for selecting different sets of probability data for use by the computing means dependent upon different types of link quality evaluation parameters, the selected set of probability data depending upon which link quality evaluation parameter is appropriate for the target network.

10. The control entity according to claim 7, further comprising:
comparison means for comparing with a threshold level ($T_{limit}$) link quality measurement data obtained via the input means; and
means for selecting different sets of probability data for use by the computing means dependent upon a value of the threshold level ($T_{limit}$) used by the comparison means.

11. A mobile telecommunications network adapted to implement blind handover of a mobile terminal from a primary cell in which the mobile terminal is operating to a target cell in a different network, the mobile telecommunications network comprising a control entity configured, in use, to instruct said blind handover, the control entity comprising:
input means for receiving data indicating a quality of communications links between the mobile terminal and a plurality of different cells in a primary network to provide evaluated quality measurements (M); and
computing means for selecting the target cell for the handover based on evaluated quality measurements (M) and on accessed probability data ($B_{k,j}$) indicating respective probabilities that different cells ($T_k$) in a target network will be the best cell to use as the target cell in the handover from different cells ($A_j$) in the primary network, the computing means being configured to weight the accessed probability data ($B_{k,j}$) based on the evaluated quality measurements (M).

* * * * *